(12) United States Patent
Hallam (10) Patent No.: US 8,953,219 B2
(45) Date of Patent: Feb. 10, 2015

(54) METHODS FOR DETERMINING PRINTER ADJUSTMENTS TO ACCOMMODATE PROOF/PRINT SUBSTRATE COLOR DIFFERENCES

(75) Inventor: Robert L. Hallam, Elk Grove Village, IL (US)

(73) Assignee: Quad/Graphics, Inc., Sussex, WI (US)

( * ) Notice: Subject to any disclaimer, the term of this patent is extended or adjusted under 35 U.S.C. 154(b) by 1452 days.

(21) Appl. No.: 12/611,390

(22) Filed: Nov. 3, 2009

(65) Prior Publication Data

US 2010/0110461 A1 May 6, 2010

Related U.S. Application Data

(60) Provisional application No. 61/110,683, filed on Nov. 3, 2008.

(51) Int. Cl.
G06F 15/00 (2006.01)
H04N 1/60 (2006.01)

(52) U.S. Cl.
CPC .......... *H04N 1/6052* (2013.01); *H04N 1/6097* (2013.01)
USPC ....................................... 358/1.9

(58) Field of Classification Search
None
See application file for complete search history.

(56) References Cited

U.S. PATENT DOCUMENTS

| | | | | |
|---|---|---|---|---|
| 5,231,504 | A * | 7/1993 | Magee | 358/500 |
| 6,755,498 | B2 * | 6/2004 | Revie et al. | 347/15 |
| 7,050,196 | B1 * | 5/2006 | Piatt et al. | 358/1.9 |
| 2002/0080373 | A1 * | 6/2002 | Collette et al. | 358/1.9 |
| 2002/0149786 | A1 * | 10/2002 | Hudson et al. | 358/1.9 |
| 2002/0159083 | A1 * | 10/2002 | Arai et al. | 358/1.9 |
| 2003/0058464 | A1 * | 3/2003 | Loveridge et al. | 358/1.9 |
| 2003/0128378 | A1 * | 7/2003 | Cooper et al. | 358/1.9 |
| 2003/0179397 | A1 * | 9/2003 | Sugimoto | 358/1.9 |
| 2007/0258102 | A1 * | 11/2007 | Bielak et al. | 358/1.9 |
| 2007/0285684 | A1 * | 12/2007 | Borg | 358/1.9 |
| 2009/0284774 | A1 * | 11/2009 | Kishimoto | 358/1.9 |

OTHER PUBLICATIONS

D. Rich, Advances in the Geometric Specifications of Instruments for the Measurement of Color and Color-Differences, IS&T NIP16: 2000 International Conference on Digital Printing Technologies, pp. 556-559 (2000).

P. Barnes, E. Early, and A.C. Parr, NIST Special Publication 250-48 Spectral Reflectance, pp. iii-viii, 1-48 w/Appendices A-J (1998).

CIE Publ. No. 44, Absolute Methods for Reflection Measurement, Technical Report, 67 pages (1979, reprint in 1990).

J. Walker, R. Saunders, J. Jackson and D. McSparon, NBS Measurement Services: Special Publication 250-20 Spectral Irradiance Calibrations (1987).

(Continued)

*Primary Examiner* — Jeremiah Bryar (74) *Attorney, Agent, or Firm* — Kilpatrick Townsend & Stockton LLP; Dean W. Russell, Esq.; Kristin M. Crall, Esq.

(57) ABSTRACT

Embodiments of the present invention provide systems and methods for adjusting for differences between a proof substrate and the ultimate substrate on which an illustration or other image is to be printed. Embodiments are particularly useful for any print process on an opaque substrate where a proof representing the expected result is provided that has a different substrate color or value from that being used in the print process.

7 Claims, 10 Drawing Sheets

(56) References Cited

OTHER PUBLICATIONS

S. Brown and Y. Ohno, NIST Calibration Facility for Display ColoriMeters, Proc., IS&T/SPIE 11$^{th}$ Intn. Symposium, Electronic Imaging '99, San Jose, 8 pages (1999).

Y. Ohno and S. Brown, Four-Color Matrix Method for Correction of Tristimulus Colorimeters—Part 2, Proc., IS&T Sixth Color Imaging Conference, 4 pages (1998).

CIE 1931 color space—Wikipedia, the free encyclopedia, http://en.wikipedia.org/wiki/CIR_1931)color_space downloaded from the Internet on Oct. 28, 2009, pp. 1-9.

Applications Note—Insight on Color—CIE L*a*b Color Scale, HunterLab, vol. 8, No. 7, pp. 1-4 (2008).

ASTM E308-08, Standard Practice for Computing the Colors of Objects by Using the CIE Systems (Jan. 2009).

ASTM E1347-06, Standard Test Method for Color and Color-Difference Measurement by Tristimulus Colorimetry (Jan. 2007).

ASTM E 1455-03, Standard Practice for Obtaining Colorimetric Data from a Visual Display Unit Using Tristimulus Colorimeters (Jan. 2004).

ISO/CIE 10527 CIE S 014-I/E First Edition, CIE standard colorimetric observers (Oct. 15, 2007).

J. Walker, R. Saunders, A. Hattenburg, NBS Measurement Services: Special Publication 250-1 Spectral Radiance Calibrations (1987).

The Sixth Color Imaging Conference: Color Science, Systems, and Applications, pp. 67-68 (copyright 1998), IS&T.

McDowell, et al., "Correcting Measured Colorimetric Data for Differences in Backing Material," *TAGA Proceedings*, 2005, pp. 302-309.

Wiley Classics Library, Wyszecki & Stiles, Color Science Concepts and Methods, Quantitative Data and Formulae, John Wiley and Sons, Inc., New York (Copyright 1982; Second Edition published 2000), Preface and Table of Contents.

\* cited by examiner

Proof Profile 'wtpt' tag values

| Virtual Proof Profile White Point | XYZ_X | XYZ_Y | XYZ_Z |
|---|---|---|---|
| Values | 0.789 | 0.789 | 0.614 | or

Proof Paper Values

| Measurement | #1 | #2 | #3 | Average |
|---|---|---|---|---|
| L | 90.71 | 90.71 | 90.71 | 90.71 |
| a | 0.19 | 0.18 | 0.17 | 0.18 |
| b | 5.00 | 4.00 | 5.00 | 4.67 |

OR

Press Paper Values

| Measurement | #1 | #2 | #3 | Average |
|---|---|---|---|---|
| L | 93.19 | 93.19 | 93.19 | 93.19 |
| a | 0.19 | 0.18 | 0.17 | 0.18 |
| b | 0.63 | 0.75 | 0.63 | 0.67 |

FIG. 4A

| Paper-Delta's | | |
|---|---|---|
| a | b | ΔL* |
| 5.46 | 2.93 | 1.24 |

| Paper Compensation | | | |
|---|---|---|---|
| C | M | Y | K |
| -1.5478 | 2.8882 | 1.5478 | 0.3149 |

— Deltas to Fig 4C

| F | 1 | |
|---|---|---|
| xn | 1.60 | |
| sl | -0.30 | |
| n | y | z |
| 0.700 | -0.044 | 0.635 |

FIG. 4B x values = input dot percentages
Δ = Change by color to current gradation or calibration values
This process is done one time for each color

| xmax | x | Δ |
|---|---|---|
| 15 | 0 | 0.000 |
| ymax | 1 | 0.458 |
| 3.55 | 2 | 0.884 |
| xb | 3 | 1.279 |
| 0 | 4 | 1.642 |
| xe | 5 | 1.973 |
| 100 | 6 | 2.273 |
| b1 | 7 | 2.542 |
| 0.01474955 | 8 | 2.779 |
| a2 | 9 | 2.984 |
| -0.0056472 | 10 | 3.157 |
| c2 | 11 | 3.300 |
| 2.28155287 | 12 | 3.410 |
| b3 | 13 | 3.489 |
| 0.12730542 | 14 | 3.536 |
| x1 | 15 | 3.552 |
| 2.E+03 | 16 | 3.552 |
| a0 | 17 | 3.550 |
| -0.0157875 | 18 | 3.548 |
| b0 | 19 | 3.544 |
| 0.4736245 | 20 | 3.540 |
| c0 | 21 | 3.534 |
| 0 | 22 | 3.528 |
| a1 | 23 | 3.521 |
| -0.0005 | 24 | 3.512 |
| c1 | 25 | 3.503 |
| 3.44 | 26 | 3.493 |
| b2 | 27 | 3.481 |
| 0.16942 | 28 | 3.469 |
| a3 | 29 | 3.456 |
| -0.0056365 | 30 | 3.442 |
| ⋮ | ⋮ | ⋮ |

FIG. 4Ca

| c3 | | 31 | 3.426 |
|---|---|---|---|
| 43.6347292 | | 32 | 3.410 |
| | | 33 | 3.393 |
| | | 34 | 3.375 |
| | | 35 | 3.356 |
| | | 36 | 3.335 |
| | | 37 | 3.314 |
| | | 38 | 3.292 |
| | | 39 | 3.269 |
| | | 40 | 3.245 |
| | | 41 | 3.220 |
| | | 42 | 3.194 |
| | | 43 | 3.167 |
| | | 44 | 3.139 |
| | | 45 | 3.110 |
| | | 46 | 3.080 |
| | | 47 | 3.049 |
| | | 48 | 3.017 |
| | | 49 | 2.984 |
| | | 50 | 2.950 |
| | | 51 | 2.915 |
| | | 52 | 2.879 |
| | | 53 | 2.842 |
| | | 54 | 2.804 |
| | | 55 | 2.766 |
| | | 56 | 2.726 |
| | | 57 | 2.685 |
| | | 58 | 2.643 |
| | | 59 | 2.600 |
| | | 60 | 2.557 |
| | | 61 | 2.512 |
| | | 62 | 2.466 |
| | | 63 | 2.419 |
| | | 64 | 2.372 |
| | | 65 | 2.323 |
| | | 66 | 2.273 |
| | | 67 | 2.223 |

⟵ New Gradation = $\Delta$ + Current Gradation

FIG. 4Cb

| | |
|---:|---:|
| ⋮ | ⋮ |
| 68 | 2.171 |
| 69 | 2.119 |
| 70 | 2.065 |
| 71 | 2.010 |
| 72 | 1.955 |
| 73 | 1.898 |
| 74 | 1.841 |
| 75 | 1.782 |
| 76 | 1.723 |
| 77 | 1.662 |
| 78 | 1.601 |
| 79 | 1.538 |
| 80 | 1.475 |
| 81 | 1.411 |
| 82 | 1.345 |
| 83 | 1.279 |
| 84 | 1.211 |
| 85 | 1.143 |
| 86 | 1.074 |
| 87 | 1.003 |
| 88 | 0.932 |
| 89 | 0.860 |
| 90 | 0.787 |
| 91 | 0.712 |
| 92 | 0.637 |
| 93 | 0.561 |
| 94 | 0.484 |
| 95 | 0.406 |
| 96 | 0.326 |
| 97 | 0.246 |
| 98 | 0.165 |
| 99 | 0.083 |
| 100 | 0.000 |

FIG. 4Cc

| | Current Gradation or Calibration Values | | | |
|---|---|---|---|---|
| | Black | Cyan | Magenta | Yellow |
| 1% | 1.00% | 1.00% | 1.00% | 1.00% |
| 2% | 2.00% | 2.00% | 2.00% | 2.00% |
| 3% | 3.00% | 3.00% | 3.00% | 3.00% |
| 5% | 5.00% | 5.00% | 5.00% | 5.00% |
| 7% | 7.00% | 7.00% | 7.00% | 7.00% |
| 10% | 10.00% | 10.00% | 10.00% | 10.00% |
| 15% | 15.00% | 15.00% | 15.00% | 15.00% |
| 20% | 20.00% | 20.00% | 20.00% | 20.00% |
| 25% | 25.00% | 25.00% | 25.00% | 25.00% |
| 30% | 30.00% | 30.00% | 30.00% | 30.00% |
| 35% | 35.00% | 35.00% | 35.00% | 35.00% |
| 40% | 40.00% | 40.00% | 40.00% | 40.00% |
| 45% | 45.00% | 45.00% | 45.00% | 45.00% |
| 50% | 50.00% | 50.00% | 50.00% | 50.00% |
| 55% | 55.00% | 55.00% | 55.00% | 55.00% |
| 60% | 60.00% | 60.00% | 60.00% | 60.00% |
| 65% | 65.00% | 65.00% | 65.00% | 65.00% |
| 70% | 70.00% | 70.00% | 70.00% | 70.00% |
| 75% | 75.00% | 75.00% | 75.00% | 75.00% |
| 80% | 80.00% | 80.00% | 80.00% | 80.00% |
| 85% | 85.00% | 85.00% | 85.00% | 85.00% |
| 90% | 90.00% | 90.00% | 90.00% | 90.00% |
| 95% | 95.00% | 95.00% | 95.00% | 95.00% |
| 98% | 98.00% | 98.00% | 98.00% | 98.00% |
| 100% | 100.00% | 100.00% | 100.00% | 100.00% |

FIG. 4D

←— New Gradation= Δ + Current Gradation

| | New Gradation or Calibration Values | | | |
|---|---|---|---|---|
| | Black | Cyan | Magenta | Yellow |
| 1% | 1.16% | 0.86% | 1.16% | 1.46% |
| 2% | 2.31% | 1.73% | 2.31% | 2.88% |
| 3% | 3.45% | 2.61% | 3.45% | 4.28% |
| 5% | 5.69% | 4.40% | 5.69% | 6.97% |
| 7% | 7.89% | 6.23% | 7.89% | 9.54% |
| 10% | 11.10% | 9.05% | 11.10% | 13.16% |
| 15% | 16.24% | 13.93% | 16.24% | 18.55% |
| 20% | 21.24% | 18.93% | 21.24% | 23.54% |
| 25% | 26.22% | 23.94% | 26.22% | 28.50% |
| 30% | 31.20% | 28.96% | 31.20% | 33.44% |
| 35% | 41.17% | 33.99% | 36.17% | 38.36% |
| 40% | 41.13% | 39.02% | 41.13% | 43.24% |
| 45% | 46.09% | 44.06% | 46.09% | 48.11% |
| 50% | 51.03% | 49.11% | 51.03% | 52.95% |
| 55% | 55.97% | 54.17% | 55.97% | 57.77% |
| 60% | 60.89% | 59.23% | 60.89% | 62.56% |
| 65% | 65.81% | 64.30% | 65.81% | 67.32% |
| 70% | 70.72% | 69.38% | 70.72% | 72.06% |
| 75% | 75.62% | 74.46% | 75.62% | 76.78% |
| 80% | 80.51% | 79.55% | 80.51% | 81.47% |
| 85% | 85.40% | 84.66% | 85.40% | 86.14% |
| 90% | 90.27% | 89.76% | 90.27% | 90.79% |
| 95% | 95.14% | 94.88% | 95.14% | 95.41% |
| 98% | 98.06% | 97.95% | 98.06% | 98.17% |
| 100% | 100.00% | 100.00% | 100.00% | 100.00% |

FIG. 4E

METHODS FOR DETERMINING PRINTER ADJUSTMENTS TO ACCOMMODATE PROOF/PRINT SUBSTRATE COLOR DIFFERENCES

This application claims the benefit of U.S. Provisional Application Ser. No. 61/110,683, filed Nov. 3, 2008 titled "Proof/Press Substrate Difference Adjustments," the entire contents of which are hereby incorporated by reference.

FIELD OF THE INVENTION

Embodiments of the present invention relate generally to systems and methods for adjusting for differences between a proof substrate and the ultimate substrate on which an illustration or other image is to be printed. Embodiments are particularly useful for any print process on an opaque substrate where a proof representing the expected result is provided that has a different substrate color or value from that being used in the print process.

BACKGROUND

When proofs that represent the expected result of a print process are provided to a printer and the actual print process is intended to use a different color substrate, the printed product on the different color substrate will not match the customer's expected results that are represented by the supplied proofs. For example, if a proof is provided on a crème-colored paper, but the end printed product is intended to be printed on a white paper (or any other colored paper), and if the colors are not adjusted properly, the end product will not have the same color tones as the supplied proof. Pastels that are printed on the crème paper will likely look different than pastels printed on white paper if no adjustments are made. Or if a proof is provided electronically and if the colors are not adjusted properly to account for the substrate color represented by the virtual or monitor-based proof, the end product will not have the same color tones as the supplied electronic proof. Accordingly, the printer must determine how to compensate the printing process in order to account for the differences and obtain a better match with the customer's well-defined expectations.

Historically, adjustments have been made to the tone reproduction curves in the print process to get a closer match, but this usually happens by trial and error or some type of guess-work on the part of the person making the process adjustment. Errors in this parameter adjustment process are costly and inaccurate. For example, the person making the process adjustment may attempt to adjust the files in four dimensions (Cyan, Magenta, Yellow, and Black) using an ICC device link profile in order to get as close to the desired end product as possible. This creates problems because there is no way to know if the correct adjustments have been made until the image is printed on the proper substrate and the color is checked. There may be color adjustment errors due to metameric ink color differences that are not detectable until the job is printed on the press, slowing down the process and adding more expense. There is thus a need for an improved method for determining the tone reproduction change necessary to produce optimum results.

BRIEF SUMMARY

Embodiments of the present invention provide systems and methods to compensate or otherwise account for and accommodate differences between a proof substrate (whether paper or electronic) and a print substrate. One specific embodiment provides a method for determining adjustment to an output of a color printer to account for color differences between an image provided on a proof substrate and the same image printed on a final print substrate. This method includes measuring the print substrate in order to determine a specific spectral or colorimetric value of the print substrate, measuring the proof substrate in order to determine a specific spectral or colorimetric value of the proof substrate, converting each spectral or colorimetric value obtained into a CIE XYZ value, converting each CIE XYZ value into CIELAB values, such that there is provided a CIELAB value of the proof substrate and a CIELAB value of the print substrate, calculating the change between the CIELAB value of the print substrate and the CIELAB value of the proof substrate, and inputting the change obtained from step (e) into the color printer such that the color printer adjusts tone reproduction, allowing an image printed on the substrate to substantially match color values of an image printed on the proof substrate.

Further embodiments relate to an apparatus for calibrating an electronic output system of a color printer so that after calibration is obtained, a print generated by the printer closely resembles the color of a monitor-based image of a virtual proof. This apparatus includes a printer calibration module configured to adjust at least one of the tone scale and the color reproduction of the printer, a display calibration module configured to determine a white point tag associated with the monitor-based image of a virtual proof and adjust that white point tag to match a measured color value of print substrate, a system to interact with an operator during calibration for commonly controlling said printer and providing an appearance match via adjustment to the printer that matches the monitor-based virtual proof with the print substrate, and a system to generate an adjustment of the printer that matches the monitor-based virtual proof with a different substrate.

Further embodiments provide a method for calibrating an electronic output system of a color printer so that after calibration, a print generated by the printer closely resembles an image of a monitor-based image of a virtual proof. This methods includes providing a monitor-based image of a virtual proof intended to be printed on a color printer, determining a white point tag associated with the monitor-based image of a virtual proof, and applying logic to match the white point tag to a print substrate having a different white point. Applying the logic may include converting the white point tag to a CIELAB value, determining a CIELAB value of the print substrate, and adjusting at least one of the tone scale and the color reproduction of the color printer in order to generate an adjustment for the color printer that matches the monitor-based image of a virtual proof.

Even further embodiments provide a method for adjusting an electronic output system of a press or color printer so that a final print closely resembles an image of a proof provided in hard copy on a proof substrate or on a video monitor. This method includes measuring the proof substrate or calibrated monitor virtual proofing white point, and applying logic to adjust the tone scale reproduction of the printer so that the color reproduction of the printed image substantially resembles the tone scale and color balance of the hard copy or monitor based proof.

Other features and embodiments are considered within the scope of the invention and are described and shown in more detail below.

DETAILED DESCRIPTION

Embodiments of the present invention relate to determining and adjusting for differences between a proof substrate and a print substrate. A proof substrate is the paper or other medium (such as a computer monitor, if the supplied proof is electronic) on which a sample image is to be printed. For example, if a customer wishes to have a flier printed by a professional printing company, the customer may provide the proof (a sample of the image) to the printer on a paper, or as a virtual or monitor-based proof, or other medium having a different tone value than the tone value of the print substrate, the paper on which the image is to be ultimately printed. In order for the ultimate printed image to have the proper color characteristics, it is necessary for the printer to compensate the printing process and adjust for the color differences in the images caused by the different substrates.

Figure 1:
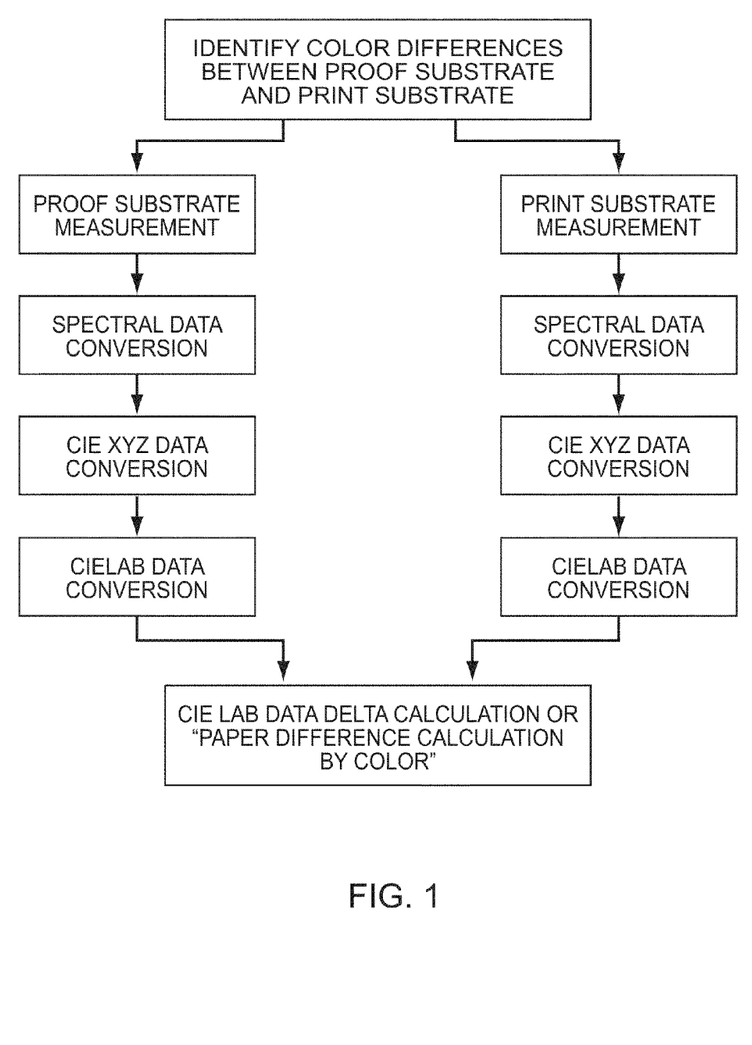
FIG. 1 is a flowchart for calculating difference adjustments according to one embodiment of the invention.

FIG. 1 illustrates one example of a flowchart for calculating such difference adjustments. The first step is to determine the differences between the colorimetric values of the proof substrate and the print substrate. In one specific embodiment, a spectrophotometer or spectrometer (or any other instrument designed to measure and determine color values of a sample) is used to measure the spectral or colorimetric values for the print substrate. This will tell the printer the brightness and light reflectance of the print substrate as a percentage or proportion of light that reflects from the paper. The proof substrate is also similarly measured. In certain embodiments, it is desirable to take multiple measurements for each substrate and then calculate an average of the colorimetric values.

More specifically, the substrate values may be measured using a spectrophotometer as self-backed measurements, where paper or another substrate is added behind the sheet being measured until the measured values do not change with any significance. This is to insure that the true paper color is being measured and not the substrate behind the paper. For illuminating and viewing conditions for the colorimetry of objects, the CIE (International Commission on Illumination, usually known as the CIE for its French name Commission Internationale de l'éclairage,) recommends the use of one of four standard geometries for the spectrophotometer—45°/normal (45/0), normal/45° (0/45), diffuse/normal (d/O), and normal/diffuse (O/d). Geometry is an important condition to specify in reflectance colorimetry. See, e.g., D. Rich, Advances in the Geometric Specifications of Instruments for the Measurement of Color and Color-Differences, Proc., IS&T NIP16 (2000). Whatever geometry is used to measure the proof substrate, that same geometry should be used to measure the print substrate. In one specific example, if 0/45 geometry is used for the proof substrate measurement, that same geometry should be used for the print substrate measurement and vice versa.

The file adjustment process thus begins with spectral measurement of the proof substrate. In a version 4 ICC profile (an industry and ISO standard color transform method), the current specification (ISO 15076-1:2005) requires that the v4 display profiles assume the viewer is fully adapted to the display white point. This means that display tristimulus values must be chromatically adapted to the D50 PCS white point when creating the profile. However, the v4 specification also requires the chromatic adaptation matrix used to be included in the chromatic adaptation tag if chromatic adaptation is needed (i.e., the display white point is not D50). This requirement makes it possible for CMMs (Color Management Module, the color engine that does the math for color transforms on any computer) to include the capability to undo the chromatic adaptation and obtain the actual display tristimulus values. Then, a capable CMM could re-introduce whatever degree of adaptation is desired. The proof and print substrate CIELAB values are then calculated (as described below) in order to obtain an adjustment factor for each color.

Once the colorimetric value for the print and substrate are obtained (from spectrally measuring both proof and print substrate), those values are converted to CIE L*a*b* using the standard CIE 1931 formula:

$$X = k\Phi(\lambda)x$$

$$\lambda \int(\lambda)d\lambda \, Y = k\Phi(\lambda)y$$

$$\lambda \int(\lambda)d\lambda$$

$$Z = k\Phi(\lambda)z$$

$$\lambda \int(\lambda)d\lambda$$

where $\Phi(\lambda)$ is the spectral distribution of light stimulus and k is a normalizing constant. These integrated values are called Tristimulus values. For light sources and displays, $\Phi(\lambda)$ is given in quantities such as spectral irradiance and spectral radiance. If $\Phi(\lambda)$ is given in an absolute unit and k=683 lm/W is chosen, Y yields an absolute photometric quantity such as illuminance or luminance. For object colors, $\Phi(\lambda)$ should be $\Phi(\lambda)=E(\lambda)\cdot R(\lambda)$ where $R(\lambda)$ is the spectral reflectance or radiance factor of the object, $E(\lambda)$ is the (relative) spectral irradiance of the illumination, and $k=100/E(\lambda)y\lambda\int(\lambda)d\lambda$.

Actual integration is performed by numerical summation of spectral data, called the CIE 1931 standard colorimetric observer. The ideal observer, whose colormatching properties correspond to the color matching functions $x(\lambda)$, $y(\lambda)$, $z(\lambda)$, with the 2° field of view and satisfying Grassmann's Law, is called the CIE 1931 standard colorimetric observer. The tristimulus values of a color are the amounts of the three primary colors (red, green, and blue) in a three-component additive color space needed to match a test color, and they are denoted in X, Y, and Z. The CIE has defined a set of three color-matching functions (the numerical description of the chromatic response of the observer), called $x(\lambda)$, $y(\lambda)$, and $z(\lambda)$, which can be thought of as the spectral sensitivity curves of three linear light detectors that yield the CIE XYZ tristimulus values.

This XYZ data then is transformed to CIE L*a*b* (CIELAB), a 3-D color space mathematically derived from CIE XYZ chromaticity coordinates resulting in greater perceptual uniformity. L*=neutral light-dark axis, a*=red/green axis and b*=blue/yellow axis. As background, the CIE has recommended use of the CIE L*a*b* (or CIELAB) color scale in order to provide a standard, approximately uniform color scale that can be used to easily compare color values. The CIELAB color scale plots difference in the color space to correspond to visual differences between the colors plotted. It is organized is a cube form, with an L* axis that runs from top to bottom. The maximum value available for L* is 100, representing white, and the minimum is zero, representing black. There are also a* and b* axes that do not have numerical limits. Positive a* is red, negative a* is green, positive b* is yellow, and negative b* is blue. Below is a diagram representing the CIELAB color space:

There are delta (change) values associated with the color scale. ΔL*, Δa*, and Δb* indicate how much a standard and a sample differ from one another in L*, a*, and b*. These delta values are often used for quality control or formula adjustment.

CIE 1976 L*a*b* is based directly on CIE XYZ. Coloring information refers to the color of the white point of the system, subscript n.

$L^* = 116*(Y/Y_n)1/3-16$ for $Y/Y_n > 0.008856$ otherwise
$L^* = 903.3*Y/Y_n$
$a^* = 500*(f(X/X_n) - f(Y/Y_n))$
$b^* = 200*(f(Y/Y_n) - f(Z/Z_n))$
where $f(t) = t1/3$ for $t > 0.008856$ otherwise
$f(t) = 7.787*t + 16/116$ (Results may be more precise with the use of fractional equations, but if decimals are needed, those equations are also provided above after the "otherwise" label.) Here Xn, Yn and Zn are the tristimulus values of the reference white. The reverse transformation (for $Y/Y_n > 0.008856$) is $X = X_n*(P + a^*/500)3$
$Y = Y_n*P\ 3$
$Z = Z_n*(P - b^*/200)3$
where $P = (L^* + 16)/116$ This is how the CIE XYZ value is converted to a CIELAB value.

Once the individual CIELAB values are obtained, the next step is to determine the CIELAB data delta, or the differences between the CIELAB values of the proof substrate and the print substrate. This data delta calculation may also be referred to as a "paper difference calculation by color," as shown in FIG. 1.

In this part of the function, simple subtraction produces the delta change between the substrate of the proof and printing substrate. So $C\Delta = ((bp - bs^* - 1)*z/yn$
$M\Delta = ((ap - as)*z)/yn$
$Y\Delta = ((bp - bs)*z)/yn$
$K\Delta = ((Lp - Ls/2)*z/2.5$ Tonal Δ=IF(tonal range<=xb,-tonal range, IF(tonal range>=xe,100-tonal range, IF(ymax<=((100-xmax)+ (100-xe))/2, IF(tonal range<=xmax,a0*tonal range*tonal range+b0*tonal range+c0), IF(tonal range<=xmax,a0*tonal range*tonal range+b0*tonal range+xb,a1*tonal range*tonal range+b1*tonal range+c1), IF(tonal range<=xmax,a0*tonal range*tonal range+b0*tonal range+xb, IF(tonal range<=x1,a2*tonal range*tonal range+b2*tonal range+c2,a3*tonal range*tonal range+ b3*tonal range+c3))

where;
xe=tonal range max
xb=tonal range min
x1=(200-xmax-2*ymax+2*c2*xe*(xe-xmax))/(2*c2* (xe-xmax)+1)
ymax=ΔY
xmax=max Δ
a0=-(xb+ymax)/((xmax-xb)*(xmax-xb))
a1=(100-xe-ymax)/((xe-xmax)*(xe-xmax))
a2=-(2*c2*(xe-x1)+1)/(2*(x1-xmax))
a3=(xmax+ymax-100)/(2*(xe-xmax)*(xe-xmax))
b0=-2*a0*xmax
b1=-2*a1*xmax
b2=-2*a2*xmax
b3=-1-2*c2*xe
c1=ymax+a1*xmax*xmax
c2=ymax+a2*xmax*xmax
c3=c2*xe*xe+100
n=0.7
y=n*(n*sl)*0.3
sl=-0.3
xn=1.6
yn=1.2
z=(n^y/xn)*1
p=proof
s=press substrate color
L=L value obtained from CIELAB calculation
a=b value obtained from CIELAB calculation
b=b value obtained from CIELAB calculation
Then Tonal Δ+printing device values Embodiments of the invention further relate to instances when the proof is provided as a monitor-based image of a virtual proof. In this instance, it is necessary to determine the ICC profile white point tag of the target proof or print condition used to create the virtual proof, such that the printing process can be adjusted appropriately. In other words, the ICC Profile white point tag XYZ values associated with the proof are used as aims for the press adjustment process.

For example, in one embodiment, there is provided an apparatus for calibrating an electronic output system of a color printer so that after calibration is obtained, a print generated by the printer closely resembles the color of a monitor-based image of a virtual proof. The apparatus may include a printer calibration module configured to adjust at least one of the tone scales and the color reproduction of the printer. The printer calibration module may adjust at least one of the printing color tone reproduction or calibration curves. The apparatus may further include a display calibration module configured to determine a white point tag associated with the monitor-based image of a virtual proof and adjust that white point tag to match a measured color value of print substrate, a system to interact with an operator during calibration for commonly controlling the printer and providing an appearance match via adjustment to the printer that matches the monitor-based virtual proof with a different print substrate (which may include operator controls for varying tone scale or color or both to match the monitor image), and a system to generate an adjustment of the printer that matches the monitor-based virtual proof with the print substrate.

The system to generate an adjustment of the printer may adjust at least one of the brightness, saturation, and hue of the image and may include a printer tone reproduction scale or look up table. The printer color adjustment values are produced for the table in response to input values from automated manual or measurement systems or changes in the means to interact with an operator. The color printer may then be configured to print the image with printer tone adjustment values applied to the printer, thereby generating an optimal print.

Embodiments also relate to methods for calibrating an electronic output system of a color printer so that after calibration, a print generated by the printer closely resembles an image of a monitor-based image of a virtual proof, comprising providing a monitor-based image of a virtual proof intended to be printed on a color printer, determining a ICC Profiles white point tag associated with the monitor-based image of a virtual proof, and applying logic (as described in the above formulas) to adjust the color reproduction on said printer with a print substrate having a different white point.

The white point tag values are typically provided as XYZ values, which may then be converted to CIELAB values as discussed above. For example, the logic may be applied to match the white point tag to a print substrate having a different white point step by converting the white point tag to a CIELAB value, determining a CIELAB value of the print substrate, and adjusting at least one of the tone scale and the color reproduction of the color printer in order to generate an adjustment for the color printer that matches the monitor-based image of a virtual proof. Applying logic to match the white point tag may further include adjusting the tone scale reproduction of the printer so that the color reproduction of the printed image substantially resembles the tone scale and color balance of the monitor-based image.

EXAMPLE

Figure 4:
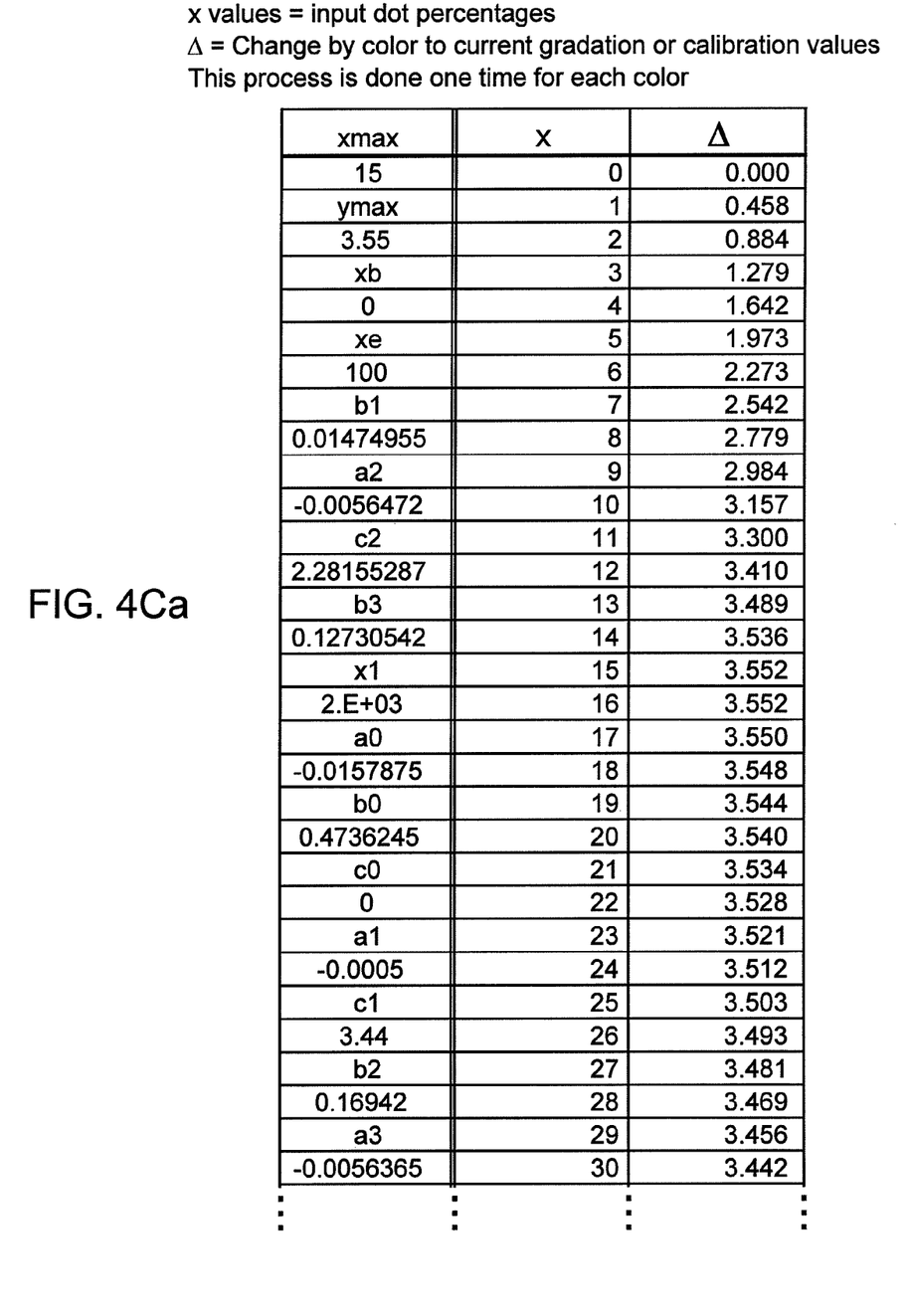
FIGS. 4A-E are examples of data compiled according to various embodiments of the invention as entered into a printing system.

The example shown in FIG. 4 provides an explanation showing a run of a proof substrate and a print substrate through the steps of one embodiment of the invention in order to calculate the differences in color values between the substrates and to input those values in order to create a new gradient. These steps help ensure that the colors of the printed product are substantially similar to the colors provided in the proof substrate, whether the proof is provided on a paper substrate or electronically.

Figure 4A:
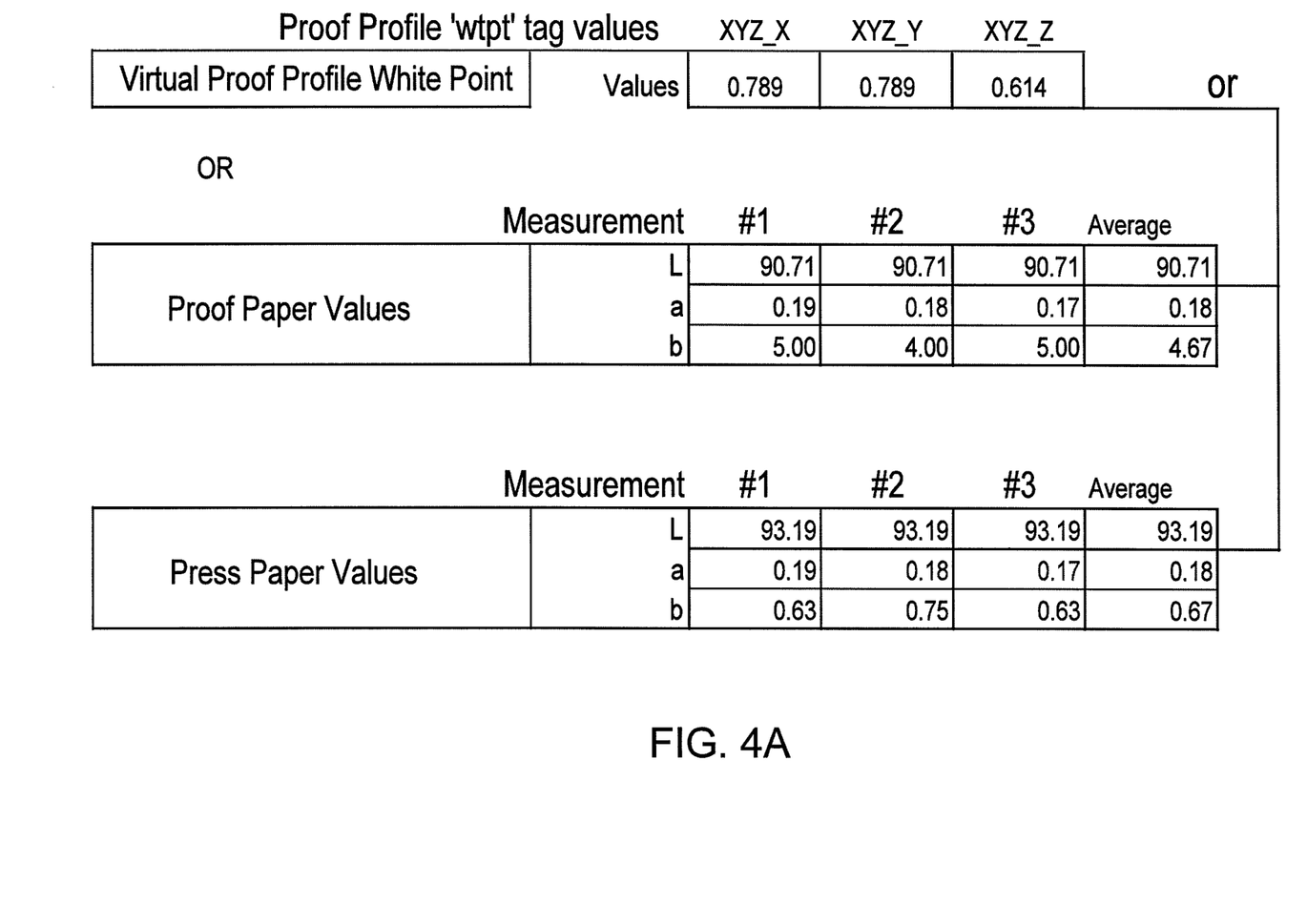
Figure 4B:
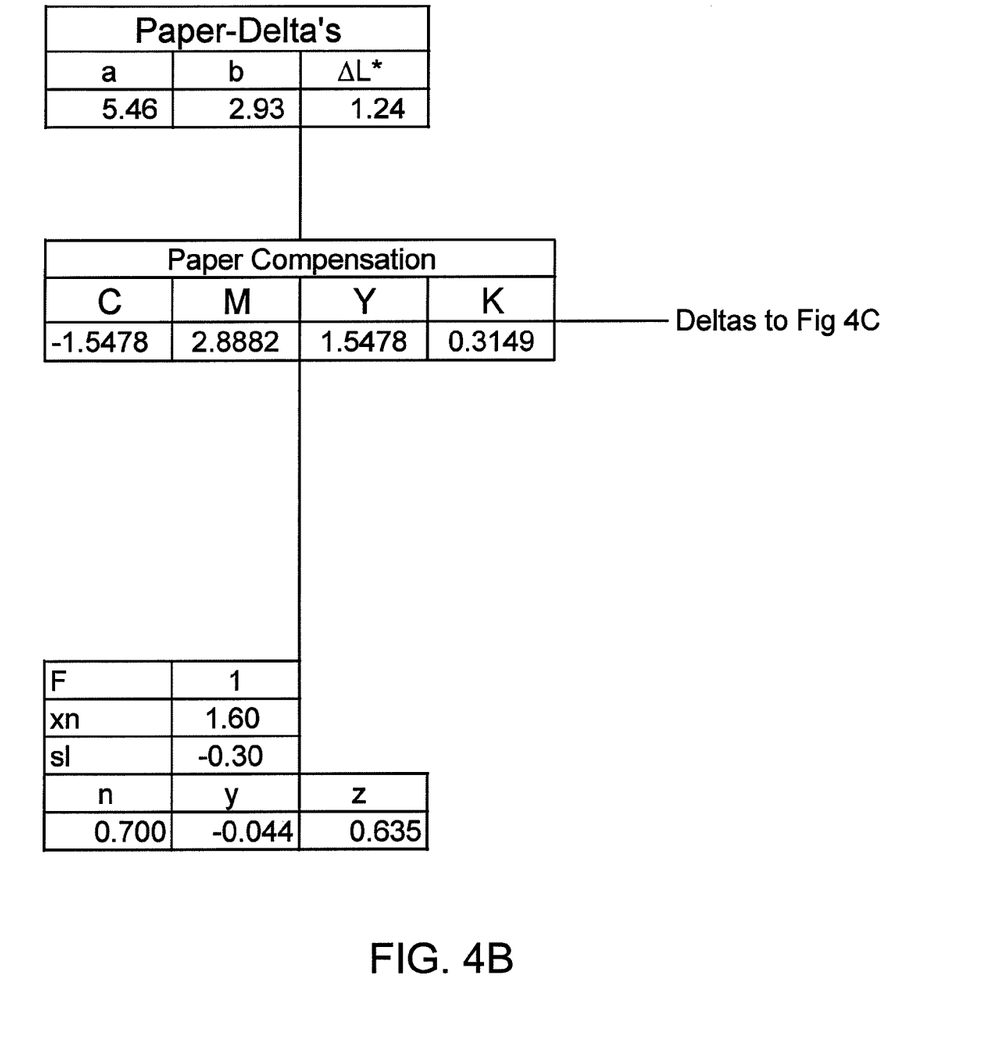

FIG. 4A shows an example of measuring the proof and print substrates and obtaining an average of those values to define a final colorimetric value of the proof substrate and final colorimetric value of the print substrate (also referred to as the press paper value"). FIG. 4B shows the resulting paper CIELAB values, which, once the appropriate formula is applied (as shown in FIG. 4C), result in CMYK paper compensation values.

Figure 2:
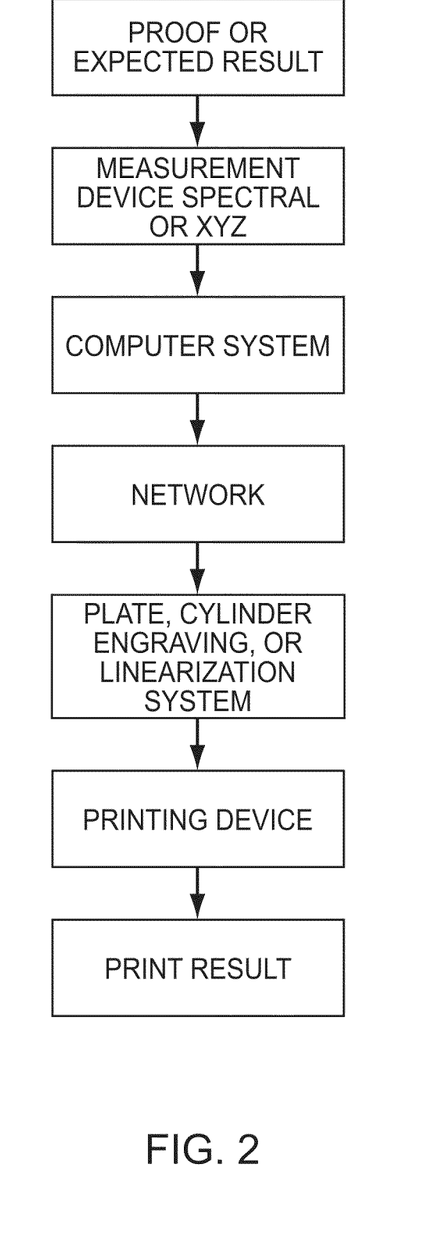
FIG. 2 is a flowchart illustrating how calculations obtained according to various embodiments of the invention may be routed through a printing system.
Figure 3:
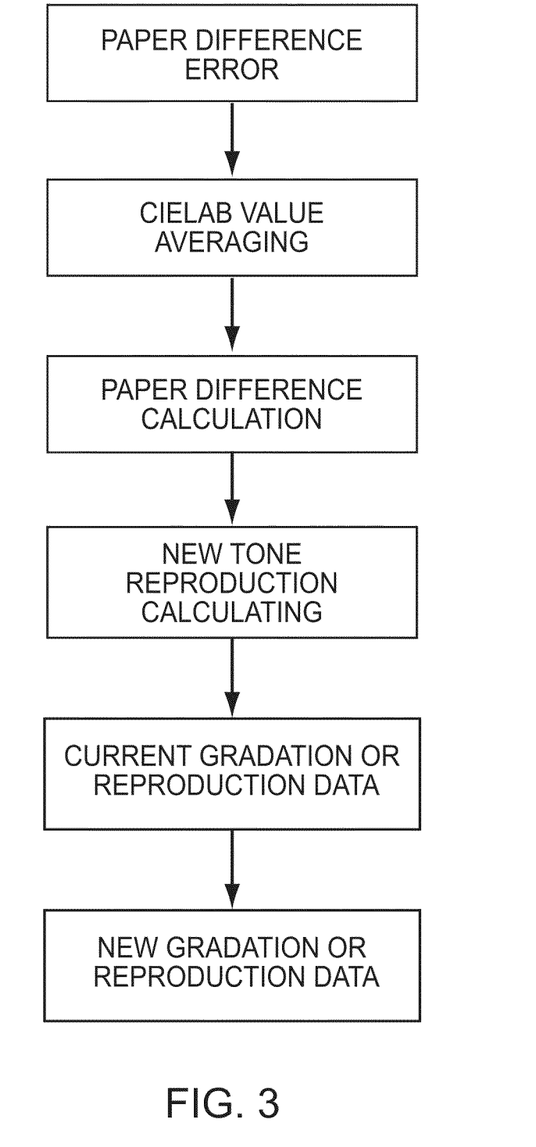
FIG. 3 is a flowchart showing the specifics of the paper difference calculation steps.
Figure 4D:
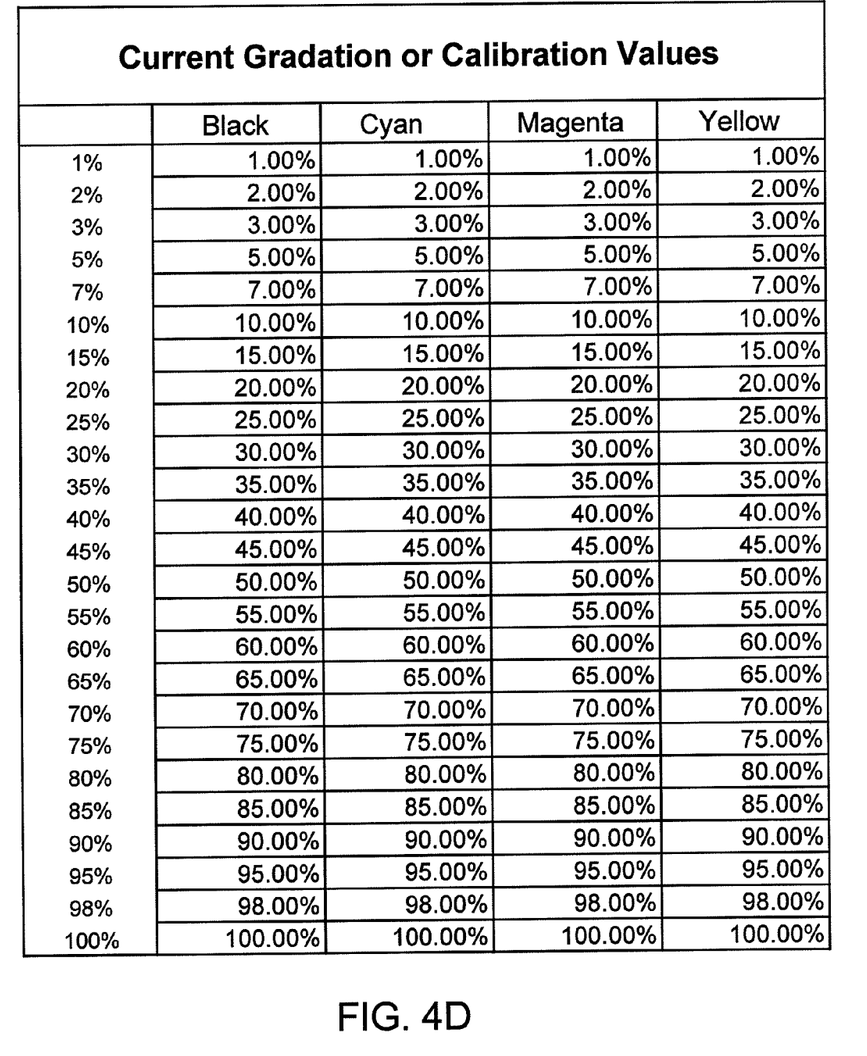
Figure 4E:
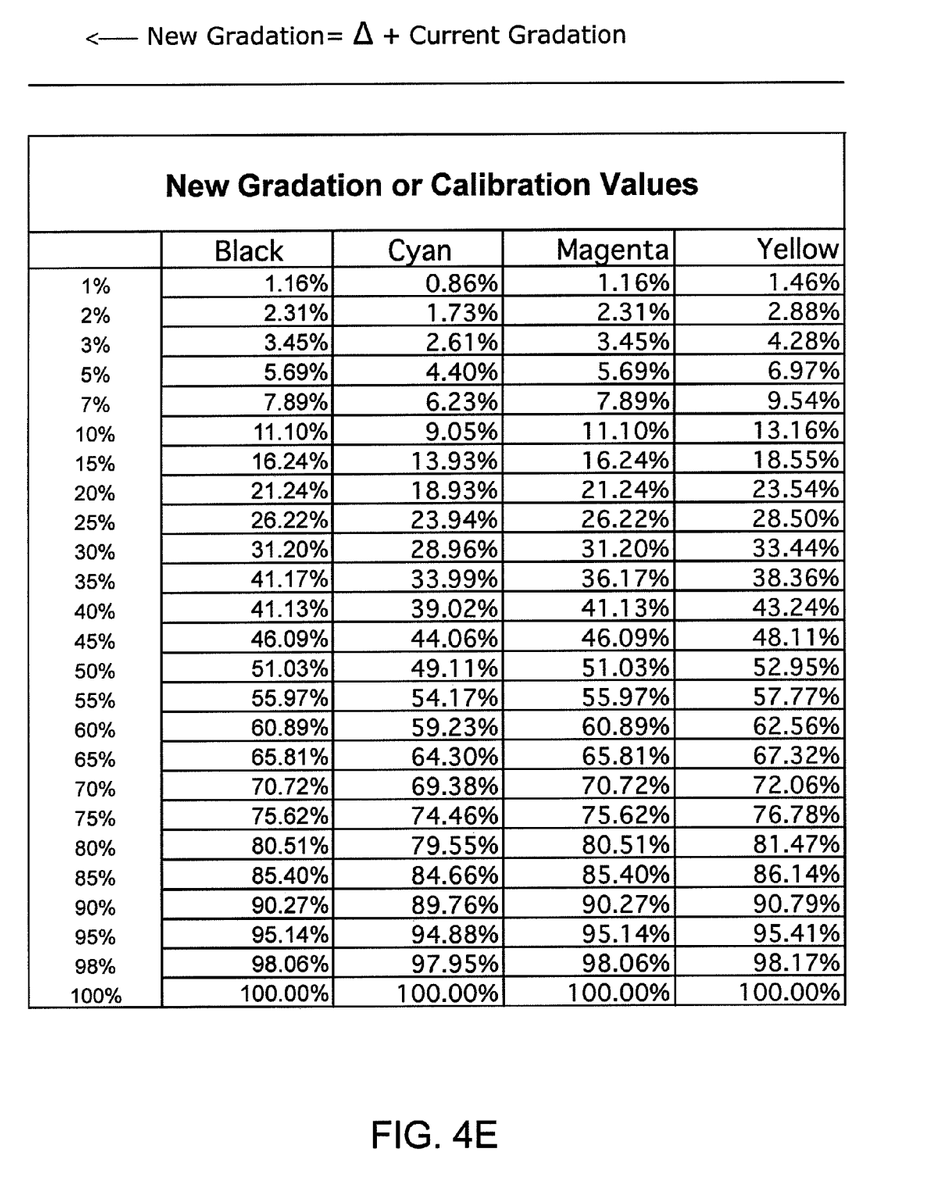

FIG. 4C shows the details of the values from the formula run. Once the results of this calculation are obtained, the operator or measurement system will input the measurements into a computer system that optionally syncs up with a network, as shown in FIG. 2. The system will modify the plate, cylinder, engraving, or linearization system in order to provide the proper color outputs. For example, the current plate curve, output gradation, or reproduction data will be modified based on the calculation in order to provide a new output gradation, plate curve, or reproduction data. An example is shown in FIGS. 4D and 4E. FIG. 4D shows the printer's current gradation values (what the printer currently runs). FIG. 4E shows how the gradation values are calibrated or modified to compensate for the proof and the resulting new gradient values. The printing device will then run a sample on a certain paper color and that sample will closely resemble the colors of the proof provided, even though the proof was provided on a substrate having a different color.

The additional example that follows qualifies the formula discussed above for 8 bit and 16 bit device encoded values. As discussed above, printing processes often require critical color matching between a representative color proof and color printing process. Different print processes require different digital values to represent the tones that must be reproduced on press. For example, some printing processes use digital values from 0 to 100% and some require 8 bit values 255-0, while others require 16 bit digital values from 0 to 65,536. In all of these print systems, adjustment to the tone reproduction curves represent tonal values that closely match the expected result. In gravure systems, the digital value of a cell is proportional to the electrical value applied to the stylus or laser that engraves the cylinder. In the case of laser engraving, the stylus voltage is proportional to the penetration of the stylus into the cylinder and the resulting cell volume. Typically, digital values are stored as one byte or 8 bits of data 0 to 255. After a specific digital value is entered into the engraving equipment, that digital value is converted to an output voltage that drives a laser or diamond stylus. Other print reproductions use bit depths of 1 to 16 bits depending on process.

In the offset printing process, digital file values of 0-100% are typically used and converted to 8 bit values in the plate making equipment. The digital value of a dot on the plate is proportional to the size of the dot created, and is proportional to the amount of dots per centimeter or per inch. It could also be proportional to the coverage of dots over the paper as a ratio of solid ink to paper. Changing these digital values in four color process printing with Cyan, Magenta, Yellow, and Black inks, for example, adjusts the tone reproduction for all the printed colors as they transition from light to dark in a print process. This adjustment of digital values adjusts the tone reproduction and color balance of the resulting image in the print process.

It should be appreciated that one or more of the process or method descriptions associated with the flow charts or block diagrams above may represent modules, segments, logic, or portions of code that include one or more executable instructions for implementing logical functions or steps in the process. It should be further appreciated that the logical functions may be implemented in software, hardware, firmware, or any combination thereof. In certain embodiments, the logical functions may be implemented in software or firmware that is stored in memory and that is executed by hardware (e.g., microcontroller) or any other processor(s) or suitable associated instruction execution system. Furthermore, the logical functions may be embodied in any computer readable medium for use by or in connection with an instruction execution system, apparatus, or device, such as a computer-based system, processor-containing system, or other system that can fetch the instructions from the instruction execution system, apparatus, or device and execute the instructions.

Changes and modifications, additions and deletions may be made to the structures and methods recited above and shown in the drawings without departing from the scope or spirit of the invention and the following claims.

What is claimed is:

1. A method for determining adjustment to an output of a color printer to account for color differences between an image provided on a proof substrate and the same image printed on a final print substrate, comprising:
   (a) measuring the print substrate in order to determine a specific spectral or colorimetric value of the print substrate;
   (b) measuring the proof substrate in order to determine a specific spectral or colorimetric value of the proof substrate;

(c) converting each spectral or colorimetric value obtained from (a) and (b) into a CIE XYZ value;
(d) converting each CIE XYZ value into CIELAB values, such that there is provided a CIELAB value of the proof substrate and a CIELAB value of the print substrate;
(e) calculating the change between the CIELAB value of the print substrate and the CIELAB value of the proof substrate;
(f) inputting the change obtained from step (e) into the color printer such that the color printer adjusts tone reproduction, allowing an image printed on the substrate to substantially match color values of an image printed on the proof substrate.

2. The method of claim 1, wherein step (e) uses the formula:

$C\Delta = ((bp-bs*-1)*z/yn$
$M\Delta = ((ap-as)*z)/yn$
$Y\Delta = ((bp-bs)*z)/yn$
$K\Delta = ((Lp-Ls/2)*z/2.5$ Tonal $\Delta$ between the proof substrate and the print substrate=
  IF(tonal range <=xb,−tonal range,
  IF(tonal range >=xe,100−tonal range,
  IF(ymax<=((100−xmax)+(100−xe))/2,
    IF(tonal range <=xmax,a0*tonal range*tonal range+ b0*tonal range+xb,a1*tonal range*tonal range+ b1*tonal range+c1),
    IF(tonal range <=xmax,a0*tonal range*tonal range+ b0*tonal range+xb,
    IF(tonal range <=x1,a2*tonal $\Delta$ range*tonal range+ b2*tonal range+c2,a3*tonal range*tonal range+ b3*tonal range+c3))

where;
tonal range=tonal range of print substrate
xe=tonal range max
xb=tonal range min
x1=(200−xmax−2*ymax+2*c2*xe*(xe−xmax))/(2*c2* (xe−xmax)+1)
ymax=$\Delta$Y
xmax=max $\Delta$
a0=−(xb+ymax)/((xmax−xb)*(xmax−xb))
a1=(100−xe−ymax)/((xe−xmax)*(xe−xmax))
a2=−(2*c2*(xe−x1)+1)/(2*(x1−xmax))
a3=(xmax+ymax−100)/(2*(xe−xmax)*(xe−xmax))
b0=−2*a0*xmax
b1=−2*a1*xmax
b2=−2*a2*xmax
b3=−1−2*c2*xe
c1=ymax+a1*xmax*xmax
c2=ymax+a2*xmax*xmax
c3=c2*xe*xe+100
n=0.7
y=n*(n*sl)*0.3
sl=−0.3
xn=1.6
yn=1.2
z=(n^y/xn)*1
p=proof
s=press substrate color
L=L value obtained from CIELAB calculation
a=a value obtained from CIELAB calculation
b=b value obtained from CIELAB calculation
THEN Tonal $\Delta$+printing device values=calculated amount of change between the CIELAB value of the print substrate and the CIELAB value of the proof substrate.

3. The method claim 1, wherein measuring the print substrate and measuring the proof substrate are conducted using a spectrophotometer.

4. The method of claim 1, wherein inputting the change further comprises adjusting the tone scale reproduction of the printer so that a color reproduction of the image printed on a final print substrate resembles the tone scale and color balance of the image provided on the proof substrate.

5. A method for adjusting an electronic output system of a press or color printer so that a final print closely resembles an image of a proof provided in hard copy on a proof substrate or on a video monitor, comprising:
(a) measuring the proof substrate or calibrated monitor virtual proofing white point; and
(b) applying logic to adjust the tone scale reproduction of the printer so that the color reproduction of the printed image resembles the tone scale and color balance of the hard copy or monitor based proof.

6. The method of claim 5, wherein the measuring the proof substrate or calibrated monitor virtual proofing white point comprises measuring the substrate color of the hard copy print or measuring the color of the monitor or virtual proof substrate by adjusting the tone reproduction of the printer or press in a complementary manner so that the printed image resembles the color of the monitor or virtual proof image.

7. The method of claim 5, wherein the applying logic to adjust the tone scale reproduction of the printer comprises adjusting at least one of the tone scale or color reproduction or both for the printer according to algorithms that produce tone scale and color modifications.

* * * * *